United States Patent
Corbo et al.

(10) Patent No.: US 10,349,739 B2
(45) Date of Patent: Jul. 16, 2019

(54) UNIVERSAL BASE MOUNTING SYSTEM FOR DESK MOUNTED MONITOR MOUNTS

(71) Applicant: Middle Atlantic Products, Inc., Fairfield, NJ (US)

(72) Inventors: Nico Corbo, Blairstown, NJ (US); Dean Wheelan, Pompton Lakes, NJ (US); Artur Harris, Ocean Grove, NJ (US)

(73) Assignee: Middle Atlantic Products, Inc., Fairfield, NJ (US)

(*) Notice: Subject to any disclaimer, the term of this patent is extended or adjusted under 35 U.S.C. 154(b) by 0 days.

(21) Appl. No.: 15/608,373

(22) Filed: May 30, 2017

(65) Prior Publication Data

US 2018/0344025 A1 Dec. 6, 2018

(51) Int. Cl.
| | |
|---|---|
| F16M 13/00 | (2006.01) |
| A47B 21/04 | (2006.01) |
| F16B 2/06 | (2006.01) |
| F16M 13/02 | (2006.01) |
| A47B 97/00 | (2006.01) |

(52) U.S. Cl.
CPC ............. *A47B 21/04* (2013.01); *F16B 2/065* (2013.01); *F16M 13/022* (2013.01); *A47B 2097/006* (2013.01); *A47B 2200/0085* (2013.01); *A47B 2200/0088* (2013.01)

(58) Field of Classification Search
CPC .............. F16M 11/10; F16M 11/2014; F16M 11/2021; F16M 11/08
USPC ...... 248/226.11, 229.11, 281.11, 284.1, 917, 248/919, 276.1, 278.1
See application file for complete search history.

(56) References Cited

U.S. PATENT DOCUMENTS

| | | | | |
|---|---|---|---|---|
| 4,562,987 A * | 1/1986 | Leeds | ............... | F16M 11/048 248/278.1 |
| 4,836,486 A * | 6/1989 | Vossoughi | ......... | F16M 11/2014 248/280.11 |
| 7,264,212 B2 * | 9/2007 | Hung | .................... | F16M 11/10 248/184.1 |
| 7,338,022 B2 * | 3/2008 | Hung | ................... | F16M 11/041 248/278.1 |

(Continued)

OTHER PUBLICATIONS

Large Hospitality Table Stand, Installation Instructions, CHIEF, STLU, Jul. 2016, 8 Pages.

(Continued)

*Primary Examiner* — Steven M Marsh
(74) *Attorney, Agent, or Firm* — Drinker Biddle & Reath LLP

(57) ABSTRACT

A universal monitor mount for attaching a monitor post to a surface, the monitor mount including a base cup with an open top, at least one side wall and a closed bottom. The base cup has an interior cavity for receiving the monitor post in use. A bottom of the base cup includes a recess sized and shaped to receive a head of a mounting bolt. At least one desktop mounting component is provided that has a plurality of attachment holes arranged to align with and attach to holes in the base cup for securing the desktop mounting component to the base cup. At least one restraining surface is formed on the base cup or on the mounting component to prevent the mounting bolt from rotating when the bolt is inserted in the recess and the desktop mounting component is attached to the base cup.

10 Claims, 7 Drawing Sheets

(56) References Cited

U.S. PATENT DOCUMENTS

| | | | | |
|---|---|---|---|---|
| 8,070,114 B2* | 12/2011 | Chen | ................... | F16M 11/14 |
| | | | | 248/121 |
| 8,366,060 B2* | 2/2013 | Hung | ................... | F16M 11/041 |
| | | | | 248/124.1 |
| 8,720,838 B2* | 5/2014 | Bowman | ................ | F16M 11/18 |
| | | | | 248/280.11 |

OTHER PUBLICATIONS

Small Swivel Table Stand, Installation Instructions, CHIEF, STS1, Jul. 2016, 14 Pages.
Desktop Swivel Mount for 26 to 47 in. Flat Panel TV's, Model HP447, Peerless-AV, Aug. 6, 2012, 7 pages.
LX Desk Mount LCD Arm, User's Guide, Jun. 2017, ERGOTRON, Jun. 2017, 14 Pages.
Flexmount 8318, Innovative Office Products, LLC, 2016, 2 pages.
Model 7500, Installation Instructions, Innovative Office Products, 2016, LLC, 3 Pages.
MM-HP-15/28/42, Installation Instructions, Premier Mounts, 2016, 1 page.

* cited by examiner

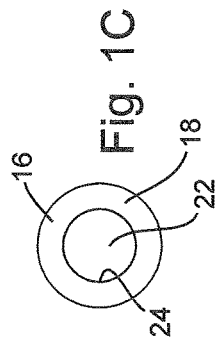
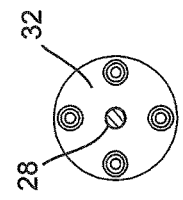
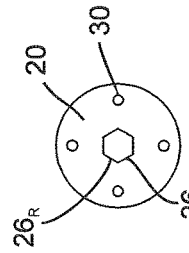
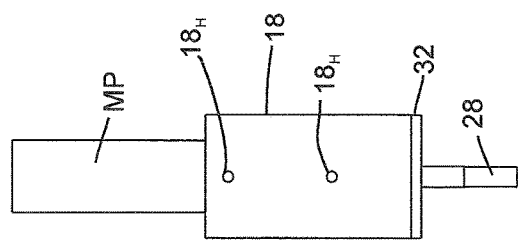
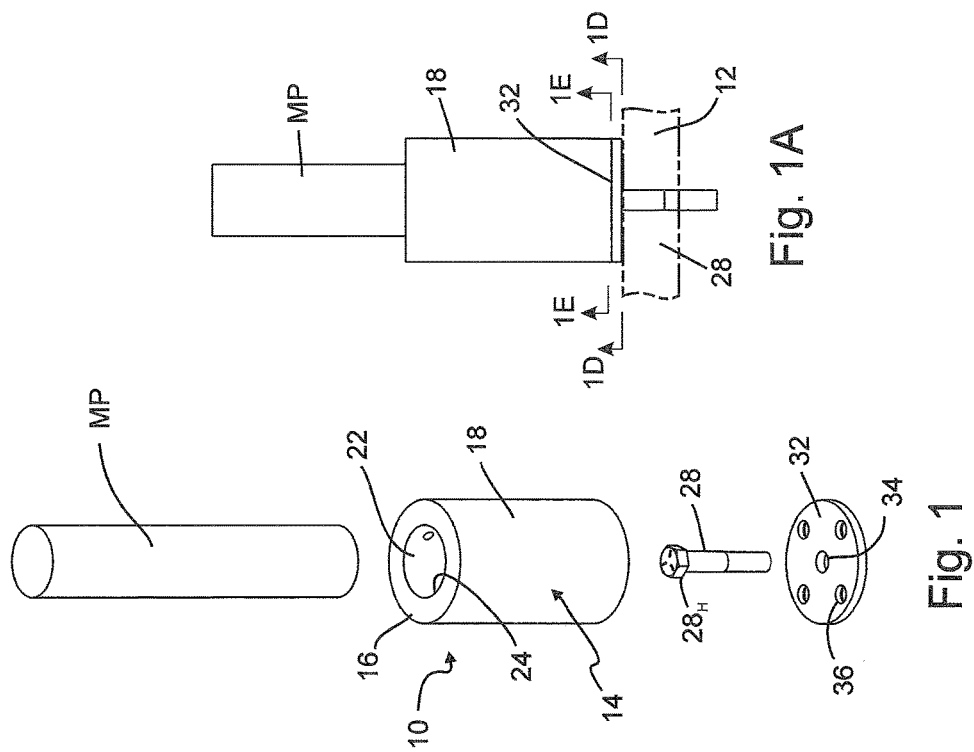

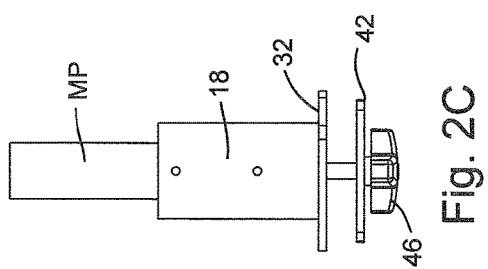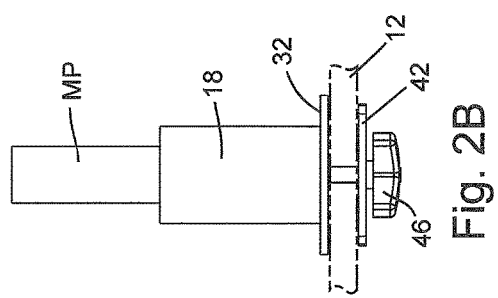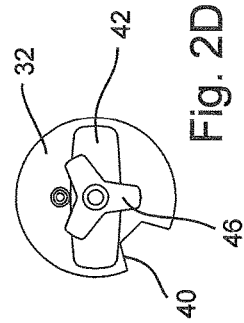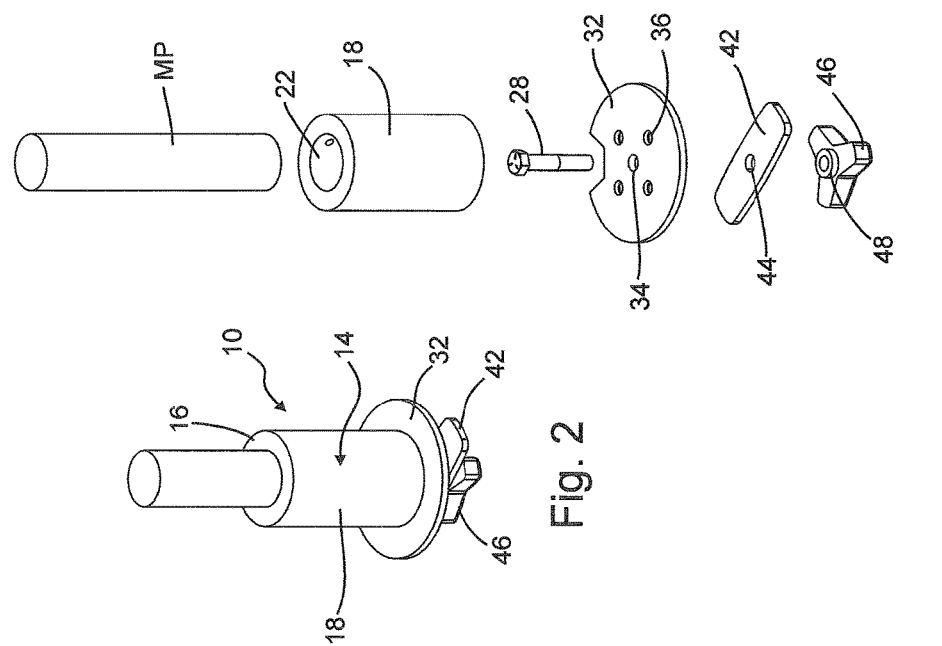

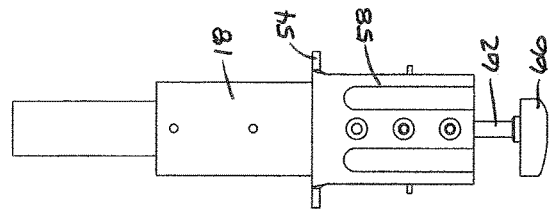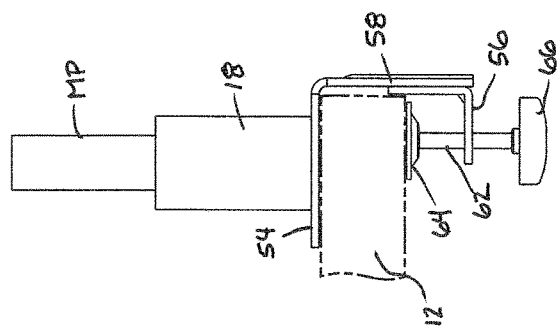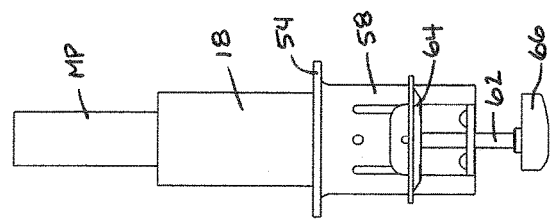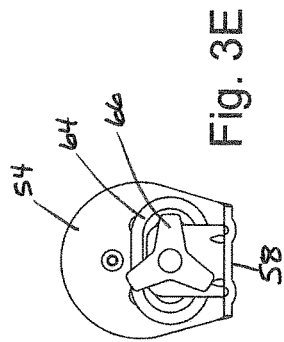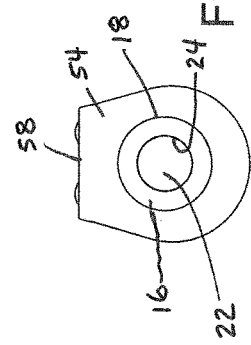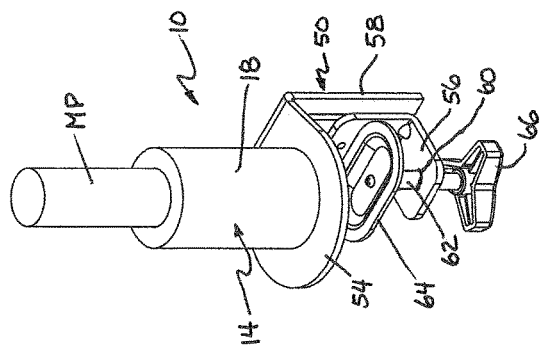

UNIVERSAL BASE MOUNTING SYSTEM FOR DESK MOUNTED MONITOR MOUNTS

FIELD OF THE INVENTION

The present invention relates to mounting systems and, more particularly, to a universal mounting system for securing monitors to desks.

BACKGROUND

The proliferation of different manufacturers computer monitors has led to a corresponding increase in the number of different mounting mechanisms for attaching computer monitors to desktops. This can create an issue for furniture and computer installers who may not know which particular type of monitor will eventually be installed on the desk. Thus, the installers need to keep multiple forms of mounts in stock and may need to return to the desk several times to make sure the appropriate mount is used.

One form of conventional mounting mechanism uses a cup that is attached to the desktop through the use of a bolt that extends into a grommet hole in the desk top. The cup provides a support in which a monitor post is inserted for securement to the desk. This type of mount generally requires a different cup for different monitor posts, and the cups do not retain the bolt, thus making installation difficult.

A need exists for a more universal mounting system for computer monitors.

SUMMARY OF THE INVENTION

A universal mount is disclosed for attaching a monitor post to a desktop surface. The mount includes a base cup which has an open top 16, at least one side wall and a closed bottom. The base cup has an interior cavity defined by an inner wall of the side wall that is sized and shaped to mate with the monitor post.

The bottom of the base cup includes a recess sized and shaped to receive the head of a mounting bolt. The recess has at least one restraining surface for preventing the head of the mounting bolt from rotating when the bolt is tightened or loosened. In one embodiment, that the recess has a hexagon shape with six flat restraining surfaces for receiving the head of a conventional shaped mounting bolt and inhibiting rotation of the bolt when the bolt head is seated in the recess. The bottom also includes a plurality of threaded holes spaced about the recess for attachment of alternate desktop mounting components.

A plurality of interchangeable desktop mounting components are provided. Each mounting component includes a plurality of attachment holes are spaced about a portion of the mounting component in positions that correspond to the threaded holes on the base cup. Screws extend through the attachment holes and thread into the mating threaded holes on the base cup.

One mounting component includes securement plate and a bolt. The securement plate has a mounting bolt hole through which the bolt passes. The securement plate also include the plurality of attachment holes which are spaced about the mounting bolt hole. The head of the bolt is placed in the recess in the base cup and the securement plate is attached to the base cup, thus securing the bolt between the securement plate and the bottom of the base cup. The restraining surfaces prevent the bolt from rotating.

Another mounting component includes a slightly larger securement plate with a notch. A mounting plate is included and has a hole sized to receive the bolt. A retention knob is threaded onto the bolt and causes the mounting plate to bear against the bottom side of the desktop, thus securing the base cup to the desktop.

Another mounting component includes a mounting clamp with a clamp bracket that is generally C-shaped with an upper bracket, a lower bracket and a connecting leg. The upper bracket includes the plurality of attachment holes that correspond to the threaded holes on the base cup. Screws extend through the attachment holes and thread into the mating threaded holes on the base cup.

The lower bracket include a threaded hole through which a clamp bolt is threaded. A clamp plate is attached to one end of the clamp bolt and a clamp knob attached at the other end. The mounting clamp is placed around the edge of a desktop and the clamp knob is turned causing the clamp plate to bear against the bottom surface of the desktop, thus securing the base cup to the desktop.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 1 is a perspective view of a universal mount for a monitor with one configuration of a desktop mounting component.

FIG. 1A is a front view of the mount of FIG. 1.

FIG. 1B is a rear view of the mount of FIG. 1.

FIG. 1C is a top view of the mount of FIG. 1 with the mounting post removed.

FIG. 1D is a bottom view of the mount of FIG. 1.

FIG. 1E is a view of the bottom of the cup in the mount of FIG. 1, taken along lines 1E-1E in FIG. 1A with the bolt removed.

FIG. 2 is a perspective view of the universal mount of FIG. 1 with another configuration of a desktop mounting component.

FIG. 2A is an exploded view of the mount of FIG. 2.

FIG. 2B is a side view of the mount of FIG. 2.

FIG. 2C is a front view of the mount of FIG. 2.

FIG. 2D is a bottom view of the mount of FIG. 2.

FIG. 3 is a perspective view of the universal mount of FIG. 1 with another configuration of a desktop mounting component.

FIG. 3A is a front view of the mount of FIG. 3.

FIG. 3B is a side view of the mount of FIG. 3.

FIG. 3C is a rear view of the mount of FIG. 3.

FIG. 3D is a top view of the mount of FIG. 3.

FIG. 3E is a bottom view of the mount of FIG. 3.

DETAILED DESCRIPTION OF THE PREFERRED EMBODIMENTS

Figure 4B:
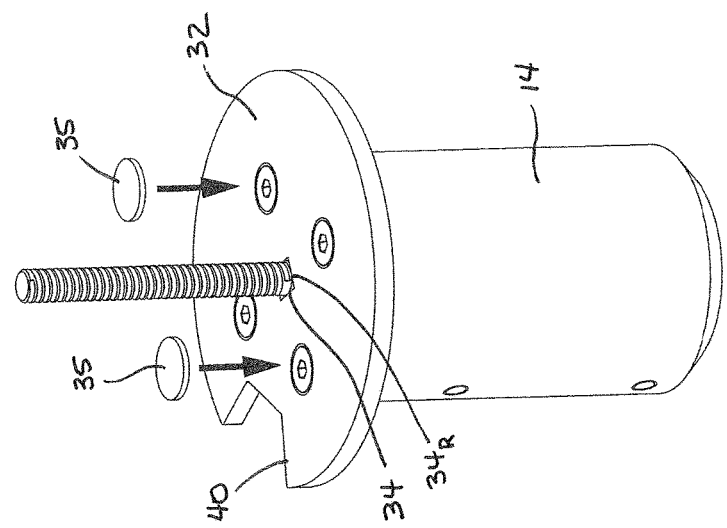
FIG. 4B is the assembled embodiment.

Referring now to the figures wherein a universal mount for attaching monitor posts to a desktops are shown with different mounting components. In the first embodiment, illustrated in FIGS. 1 and 1A-1E, the universal mount 10 is shown that can be attached to a desk top surface (shown in phantom in FIG. 1B and identified by the numeral 12). The mount 10 includes a base cup 14 which has an open top 16, at least one side wall 18 and a closed bottom 20. The base cup 14 has an interior cavity 22 defined by an inner wall 24 of the side wall 18. In the illustrated embodiment, the interior wall 24 is preferably cylindrical in shape having a diameter of approximately 1.4 inches for mating with a mounting post MP of a conventional monitor mount. The shape of the outside surface of the side wall 18 is not critical, and may be cylindrical as shown or any ornamentally desirable shape. One or more screw holes $18_H$ may be formed in the side wall 18 for receiving set screws (not shown) for use in retaining the mounting post MP within thin base cup 14 in a conventional manner.

The bottom 20 of the base cup 14 is shown in FIG. 1E and includes a recess 26 formed in the bottom 20. The recess is sized and shaped to receive the head of a mounting bolt 28 as will be discussed in more detail in the embodiments below. The recess has at least one restraining surface $26_R$ for preventing the head of the mounting bolt 28 from rotating when the bolt is tightened or loosened. In the illustrated embodiment, it is preferable that the recess 26 has a hexagon shape with six flat restraining surfaces $26_R$ for receiving the head $28_H$ of a conventional shaped mounting bolt 28 and inhibiting rotation of the bolt when the bolt head $28_H$ is seated in the recess 26. As should be apparent the recess 26 can have various other shapes for accommodating different mounting bolts 20 as long as there are a sufficient number of restraining surfaces $26_R$ formed in the recess 26 to prevent or limit rotation of the bolt head $28_H$ in both directions. The bottom 20 also includes a plurality of threaded holes 30 spaced about the recess 26 for attachment of various desktop mounting components as will be discussed herein.

A first configuration of a mounting component is shown which includes securement plate 32 (shown in FIGS. 1 and 1D). The securement plate 32 includes a mounting bolt hole 34 through which the bolt 28 passes, and a plurality of attachment holes 36 are spaced about the securement plate 32 in positions that correspond to the threaded holes 30 on the base cup 14. The securement plate 32 is attached to the bottom 20 of the base cup 14 with the mounting bolt hole 34 aligned with the recess 26 and the attachment holes 36 aligned with the threaded holes 30. Screws extend through the attachment holes 36 and thread into the mating threaded holes 30 on the base cup 14.

Figure 5:
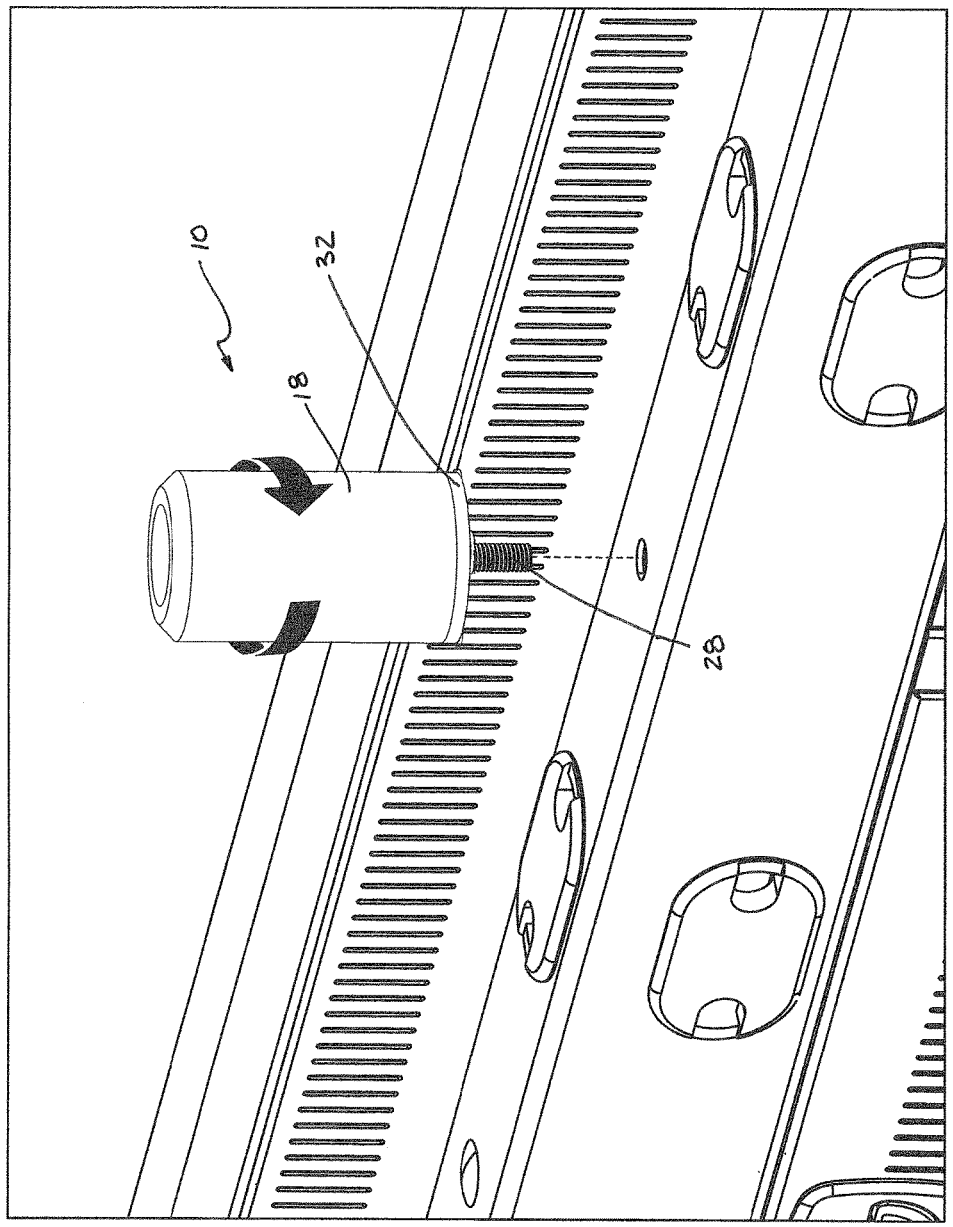
FIG. 5 illustrates the attachment of the universal mount of FIG. 1 to a desktop that includes a threaded hole.

As shown in FIGS. 1A-1D, when the bolt head $28_H$ is located in the recess 26 and the securement plate 32 is attached to the base cup 14, the bolt 28 extends through the bolt hole 34 in the securement plate 32 and the bolt head $28_H$ is secured between the securement plate 32 and the bottom 20 of the base cup 12. The restraining surfaces $26_R$ prevent the bolt from rotating, thus causing the bolt 28 to act as a threaded post extending from the bottom of the base cup 12. The configuration of the mounting component shown in FIGS. 1A-1D is particularly applicable to mounting to a threaded aperture in a console, such as the ViewPoint™ Series Console System sold by Middle Atlantic Products, Inc. which includes threaded holes in the desktop. As shown in FIG. 5, the bolt 28 that extends out of the base cup 14 is threaded directly into the hole in the console top, thus securing the universal mount 10 to the desktop.

Referring now to FIGS. 2 and 2A-2D, another configuration of a mounting component is shown for use with the universal mount in FIG. 1. In this configuration, the base cup 14 and bolt 28 are the same. The securement plate 32 is modified slightly so as to be slightly larger than the size of the bottom 20 of the base cup 14 and includes a notch 40. The notch 40 is adapted to provide a suitable pass through for cabling and wiring when the mount 10 is attached to a desktop. See, for example FIG. 6. The larger size of the securement plate 32 is designed to span over the conventional opening of a grommet hole in the desktop/furniture.

A mounting plate 42 is included and has a hole 44 sized to receive the bolt 28. A retention knob 46 has a threaded recess 48 configured to thread onto the bolt 28. In use, the universal mounting assembly 10 is placed on the desktop with the bolt 28 extending through a grommet hole in the desktop 12. The mounting plate 42 is slid onto the bolt on the bottom side of the desktop and the retention knob 46 is threaded onto the bolt as shown in FIG. 2D, thus securing the universal mounting assembly 10 to the desktop 12.

Figure 4A:
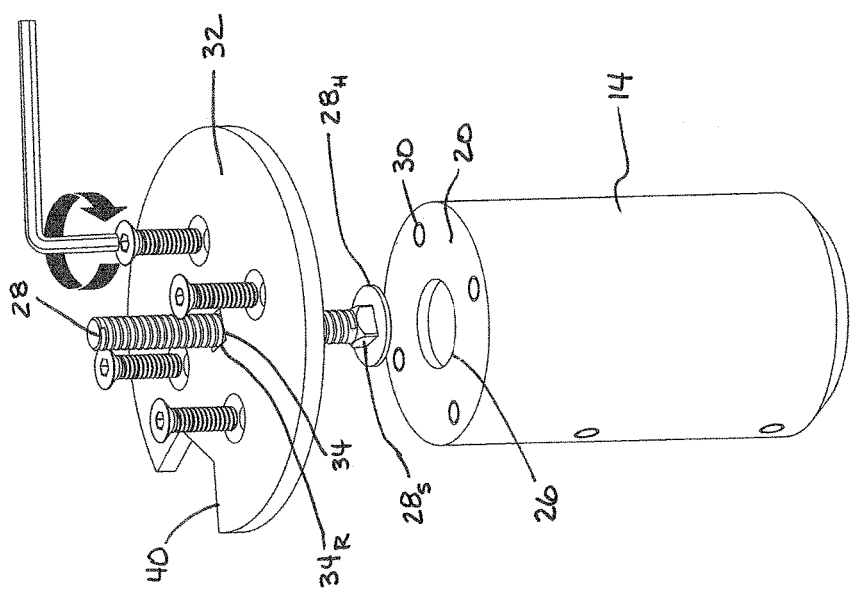
FIG. 4A is an exploded view of an alternate embodiment of the universal mount of FIG. 1

FIGS. 4A and 4B illustrate an alternate embodiment of the universal mount 10. In this embodiment, the base cup 18 includes a recess 26 that is shaped to receive the head $28_H$ of the bolt 28 as discussed above (or it could be a hole that goes completely through the bottom). However, the recess 26 does not include restraining surfaces. Instead, the restraining surfaces $34_R$ are formed on the hole 34 in the securement plate 32. Specifically, in this embodiment, the bolt 28 is a carriage bolt that includes a square shoulder $28_S$ below the head $28_H$. The hole 34 in the securement plate 32 is preferably square and sized to accept and retain the square shoulder 28S of the bolt 28, this inhibiting rotation of the bolt 28 when the plate 32 is secured to the base cup 14. Also show in FIG. 4B are protective caps 35 that can be removably attached to the heads of the screws. Only two protective caps are shown in FIG. 4B, but there are preferably protective caps for each screw head.

Referring now to FIGS. 3 and 3A-3E, another configuration of a mounting component is shown for use with the universal mount in FIG. 1. In this configuration, the base cup 14 is the same, but the bolt 28 and securement plate 32 are not needed and, thus, are not attached to the base cup. Instead, a mounting clamp 50 is secured to the base cup 14. Specifically, the mounting clamp 50 has a generally C-shape with an upper bracket 54, a lower bracket 56 and a connecting leg 58. In the illustrated embodiment of FIG. 3, the mounting clamp 50 is formed from two angle brackets attached to one another as shown. The upper bracket 54 includes a plurality of attachment holes 53 (not shown in FIG. 3, but visible in FIGS. 8A and 8B which shown the mounting clamp inverted) that are spaced about the upper bracket 54 in positions that correspond to the threaded holes 30 on the base cup 14. The upper bracket 54 is attached to the bottom 20 of the base cup 14 through the use of screws that extend through the attachment holes 36 and thread into the mating threaded holes 30 on the base cup 14.

The lower bracket 56 includes a threaded hole 60. A clamp bolt 62 is threaded through the hole 60 and has a clamp plate 64 attached to one end and a clamp knob 66 attached at the other end. The clamp bolt 62, clamp plate 64 and clamp knob 66 form a well-known attachment mechanism. In use, the mounting clamp 50 is attached to the base cup 14 and the combination is placed around the edge of a desktop 12. The clamp knob 66 is turned causing the clamp plate 64 to bear against the bottom surface of the desktop 12, thus securing the base cup 14 to the desktop 12.

Figure 8B:
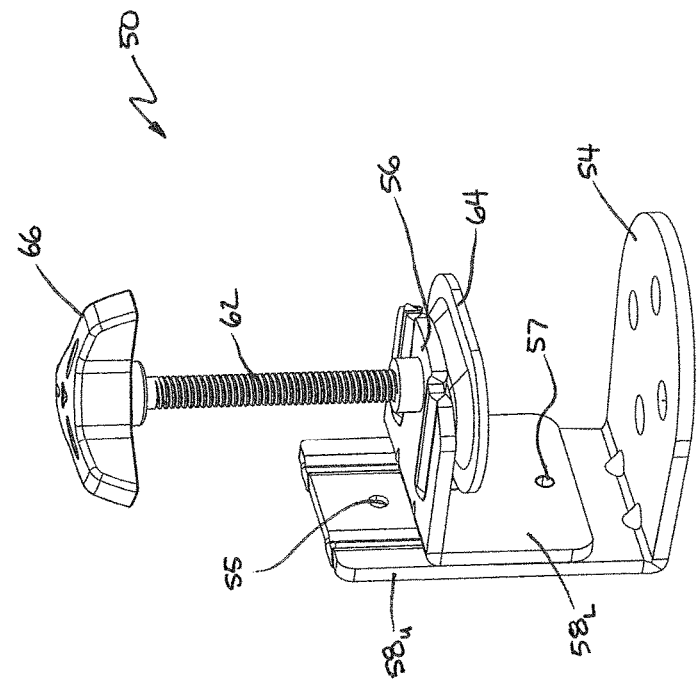
FIGS. 8A and 8B are alternate configurations of the clamp mount of FIG. 3.
Figure 8A:
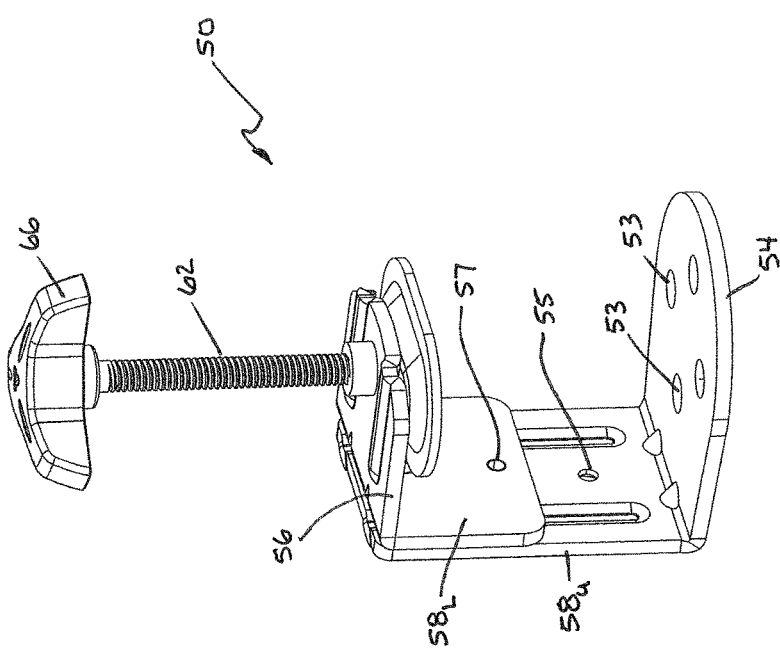

Referring to FIGS. 8A and 8B, the two angles that form mounting clamp 50 are shown in more detail. One angle includes the upper bracket 54 and an upper portion of the leg 58$_U$, the other angle includes the lower bracket 56 and a lower portion of the leg 58$_L$. The upper and lower portions of the leg 58$_U$, 58$_L$ are attached to one another with screws. To permit adjustability, one of the leg portions preferably includes three or more mounting holes 55 and the other of the leg portions preferably includes two mounting holes 57. Thus, the angles can be attached to each other so as to provide different spacing of the upper and lower brackets 54, 56 as shown in FIGS. 8A and 8B.

Figures 6, 7:
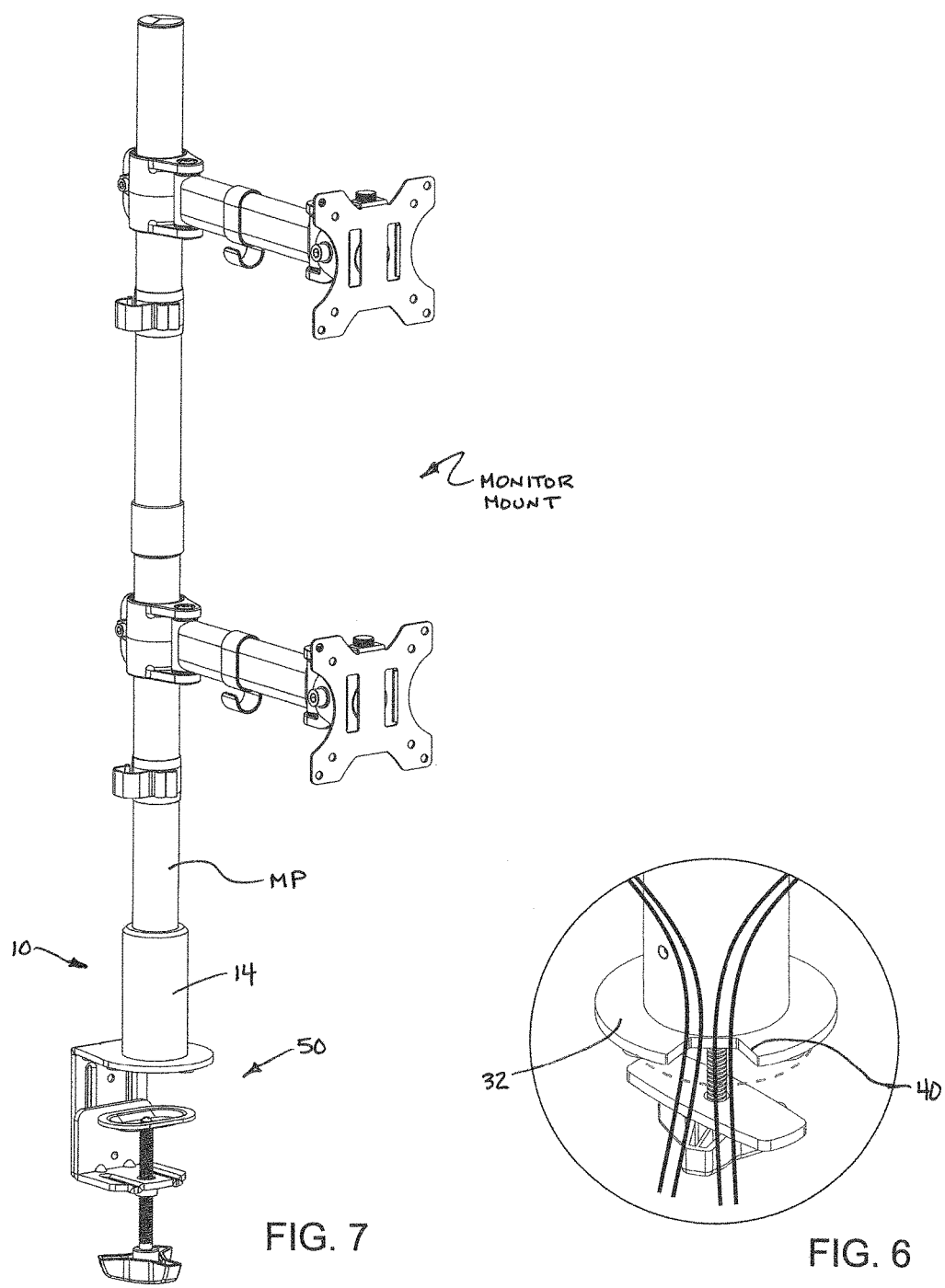
FIG. 6 is an enlarged view illustrating the passing of wires through the notch in the securement plate of the mount of FIG. 2.
FIG. 7 is a perspective view of the universal mount of FIG. 3 with a monitor mount attached.

FIG. 7 illustrates a monitor mount attached to the universal mount 10. Specifically, the mounting post MP of the monitor mount is shown inserted into the interior of the base cup 14.

It is envisioned that the universal mount 10 would be provided in a kit that includes the base cup 14, bolt 28, one or more securement plates 32, mounting plate 42, retention knob 44 and mounting clamp 50. This permits the installer to choose the appropriate mounting component to use to secure the base cup to the particular desktop.

For the purposes of promoting an understanding of the principles of the invention, reference has been made to embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention claimed is:

1. A universal monitor mount for attaching a monitor post to a desktop surface comprising:
    a base cup with an open top, at least one side wall and a closed bottom, the base cup has an interior cavity defined by an inner wall of the side wall for receiving a monitor post in use, an exterior face of the bottom of the base cup includes a recess sized and shaped to receive a head of a mounting bolt, a plurality of threaded holes are formed in the bottom and spaced about the recess;
    at least one desktop mounting component having a plurality of attachment holes arranged to align with the plurality of threaded holes in the base cup for securing the at least one desktop mounting component to the base cup; and
    wherein there is at least one restraining surface is-formed on the recess of the base cup or on the mounting component, the restraining surface adapted to prevent the mounting bolt from rotating when the bolt is inserted in the recess and the desktop mounting component is attached to the base cup.

2. A universal monitor mount according to claim 1, wherein there are a plurality of interchangeable desktop mounting components provided in a kit, each mounting component having a plurality of attachment holes arranged to align with the plurality of threaded holes in the base cup for securing the desktop mounting component to the base cup.

3. A universal monitor mount according to claim 2, wherein one of the plurality of mounting components is a securement plate and a bolt, the securement plate has a mounting bolt hole through which the bolt passes, wherein the plurality of attachment holes are located on the securement plate and spaced about the mounting bolt hole, wherein the head of the bolt is located in the recess in the base cup and the securement plate is attached to the base cup through a plurality of screws so that the securement plate traps the bolt head between the securement plate and the bottom of the base cup, the restraining surfaces prevent the bolt head from rotating.

4. A universal monitor mount according to claim 3, further including a mounting plate with a hole sized to receive the bolt, and a retention knob threaded onto the bolt, wherein rotation of the retention knob causes the mounting plate to move along the bolt toward or away from the securement plate.

5. A universal monitor mount according to claim 2, wherein one of the plurality of mounting components is a clamp with a clamp bracket that is generally C-shaped with an upper bracket, a lower bracket and a connecting leg, the upper bracket includes the plurality of attachment holes, the upper bracket is attached to the base cup through the screws that extend through the attachment holes and thread into the mating threaded holes on the base cup, the lower bracket includes a hole through which a clamp bolt is threaded, a clamp plate is attached to one end of the clamp bolt and a clamp knob attached at the other end, wherein rotation of the clamp knob causes the clamp plate to translate toward or away from the upper bracket.

6. A universal monitor mount according to claim 2, wherein the recess has a hexagon shape with six flat restraining surfaces for receiving the head of a conventional shaped mounting bolt and inhibiting rotation of the bolt when the bolt head is seated in the recess.

7. A universal monitor mount kit for attaching monitor posts to desktop surfaces, the kit including a universal mount according to claim 1,
    wherein the at least one mounting component comprises a first desktop mounting component and a second desktop mounting component, the first desktop mounting component including a securement plate and a bolt, the securement plate has a mounting bolt hole through which the bolt passes, wherein the plurality of attachment holes are located on the securement plate and arranged to align with the plurality of threaded holes in the base cup for securing the first desktop mounting component to the base cup, the plurality of attachment holes are spaced about the mounting bolt hole, wherein the bolt has a head that is adapted to be located in the recess in the base cup;
    a mounting plate with a hole sized to receive the bolt, and a retention knob adapted to thread onto the bolt;
    the second desktop mounting component including a clamp with a clamp bracket that is generally C-shaped with an upper bracket, a lower bracket and a connecting leg, the upper bracket includes a plurality of attachment holes arranged to align with the plurality of threaded holes in the base cup for securing the first desktop mounting component to the base cup, the lower bracket includes a hole through which a clamp bolt is threaded, a clamp plate is attached to one end of the clamp bolt and a clamp knob attached at the other end such that rotation of the clamp knob is adapted to cause the clamp plate to translate toward or away from the upper bracket; and wherein the at least one restraining surface is formed either (a) on the recess of the bottom of the base cup, or (b) on the mounting bolt hole of the securement plate of the first mounting component, and the hole on the mounting plate, the restraining surface configured to prevent the mounting bolt from rotating when the bolt is inserted in the recess and the securement plate or the mounting plate is attached to the base cup.

8. A universal monitor mount according to claim 1, wherein the at least one mounting component is a securement plate and a bolt, the securement plate has a mounting bolt hole through which the bolt passes, wherein the plurality of attachment holes are located on the securement plate and spaced about the mounting bolt hole, wherein the head of the bolt is located in the recess in the base cup and the securement plate is attached to the base cup through a plurality of screws so that the securement plate traps the bolt head between the securement plate and the bottom of the base cup, the restraining surfaces prevent the bolt head from rotating.

9. A universal monitor mount according to claim 8, further including a mounting plate with a hole sized to receive the bolt, and a retention knob threaded onto the bolt, wherein rotation of the retention knob causes the mounting plate to move along the bolt toward or away from the securement plate.

10. A universal monitor mount according to claim 9, wherein the recess has a hexagon shape with six flat restraining surfaces for receiving the head of a conventional shaped mounting bolt and inhibiting rotation of the bolt when the bolt head is seated in the recess.

\* \* \* \* \*